(12) United States Patent
White et al.

(10) Patent No.: US 12,000,810 B2
(45) Date of Patent: Jun. 4, 2024

(54) FITTING ASSEMBLIES FOR FLUIDIC CONNECTIONS

(71) Applicant: AGILENT TECHNOLOGIES, INC., Santa Clara, CA (US)

(72) Inventors: Richard P. White, Glen Mills, PA (US); Wesley M. Norman, Ludenberg, PA (US); Li Xu, Shanghai (CN); Wen-Yi Ge, Shanghai (CN)

(73) Assignee: Agilent Technologies, Inc., Santa Clara, CA (US)

( * ) Notice: Subject to any disclaimer, the term of this patent is extended or adjusted under 35 U.S.C. 154(b) by 384 days.

(21) Appl. No.: 17/294,256

(22) PCT Filed: Nov. 14, 2018

(86) PCT No.: PCT/CN2018/115352
§ 371 (c)(1),
(2) Date: May 14, 2021

(87) PCT Pub. No.: WO2020/097812
PCT Pub. Date: May 22, 2020

(65) Prior Publication Data
US 2022/0003724 A1    Jan. 6, 2022

(51) Int. Cl.
*G01N 30/60* (2006.01)
*G01N 30/02* (2006.01)

(52) U.S. Cl.
CPC ..... *G01N 30/6026* (2013.01); *G01N 30/6047* (2013.01); *G01N 2030/025* (2013.01)

(58) Field of Classification Search
CPC ........... G01N 30/6026; G01N 30/6047; G01N 2030/025

USPC .................................. 210/198.2, 198.3, 656
See application file for complete search history.

(56) References Cited

U.S. PATENT DOCUMENTS

| | | |
|---|---|---|
| 4,083,702 A | 4/1978 | Hartigan et al. |
| 4,522,715 A | 6/1985 | Walters |
| 4,565,632 A | 1/1986 | Hatch et al. |
| 4,619,473 A | 10/1986 | Someya |
| 4,854,181 A | 8/1989 | Gerstel |
| 4,938,509 A | 7/1990 | Laplante |
| 5,236,668 A | 8/1993 | Higdon |
| 5,298,225 A | 3/1994 | Higdon |

(Continued)

FOREIGN PATENT DOCUMENTS

| | | |
|---|---|---|
| CN | 101017161 A | 8/2007 |
| CN | 204903481 U | 12/2015 |

(Continued)

OTHER PUBLICATIONS

Machine-generated English translation of CN 208283342, generated on Sep. 20, 2023.*

(Continued)

*Primary Examiner* — Fred Prince

(57) ABSTRACT

A fitting assembly (100) is provided. The fitting assembly (100) comprises a holder (102) that holds one or more fluidic seal assemblies. The fluidic seal assembly comprises a fitting (104), a ferrule (110) and a tube (112), such as a chromatography column, and optionally comprises a protrusion (118) and a compliant seal material (120). Fluidic connections for a gas chromatography instrument are also provided.

18 Claims, 11 Drawing Sheets

(56) References Cited

U.S. PATENT DOCUMENTS

| | | | |
|---|---|---|---|
| 5,487,569 A * | 1/1996 | Silvis | G01N 30/6034 |
| | | | 285/911 |
| 5,804,701 A | 9/1998 | Berger | |
| 5,988,703 A | 11/1999 | Craig | |
| 6,209,928 B1 | 4/2001 | Benett et al. | |
| 6,319,476 B1 | 11/2001 | Victor, Jr. et al. | |
| 6,613,224 B1 | 9/2003 | Strand | |
| 7,311,882 B1 | 12/2007 | Renzi | |
| 7,553,455 B1 | 6/2009 | Renzi et al. | |
| 9,638,676 B2 | 5/2017 | Walsh et al. | |
| 2004/0189314 A1 | 9/2004 | Le Foll et al. | |
| 2004/0255608 A1* | 12/2004 | Hector | F16L 19/065 |
| | | | 285/39 |
| 2006/0038402 A1 | 2/2006 | Norman et al. | |
| 2008/0038152 A1 | 2/2008 | Van Pelt | |
| 2008/0093300 A1 | 4/2008 | Clarke et al. | |
| 2010/0327577 A1 | 12/2010 | Funke | |
| 2012/0086171 A1 | 4/2012 | Picha et al. | |
| 2012/0169040 A1 | 7/2012 | Barnett et al. | |
| 2014/0053639 A1 | 2/2014 | Dellarovere et al. | |
| 2016/0377203 A1 | 12/2016 | Norman et al. | |
| 2017/0350429 A1 | 12/2017 | Bailey et al. | |

FOREIGN PATENT DOCUMENTS

| | | | |
|---|---|---|---|
| CN | 105264371 A | | 1/2016 |
| CN | 206515302 U | | 9/2017 |
| CN | 108700559 A | | 10/2018 |
| CN | 208283342 U | * | 12/2018 |
| EP | 2975398 A1 | | 1/2016 |
| JP | H07253422 A | | 10/1995 |
| JP | 2000214147 A | | 8/2000 |
| JP | 2001501303 A | | 1/2001 |
| JP | 2011089853 A | | 5/2011 |
| JP | 2014513299 A | | 5/2014 |
| WO | 2015004757 A1 | | 1/2015 |

OTHER PUBLICATIONS

EPO, "Extended European Search Report dated Jun. 7, 2022", Application No. 18940407.2, 9 pages.

Agilent Technologies. (2016). Agilent 490 Micro GC; Go Mobile With a Complete, Portable GC. [Brochure]. 12 pages. https://www.agilent.com/cs/library/brochures/5991-6041EN.pdf.

Notification of Transmittal of The International Search Report and Written Opinion dated Aug. 13, 2019, International Patent Application No. PCT/CN2018/115352, 10 pages.

* cited by examiner

FITTING ASSEMBLIES FOR FLUIDIC CONNECTIONS

CROSS-REFERENCE TO RELATED APPLICATIONS

None.

FIELD OF THE INVENTION

The present disclosure relates generally to a fitting assembly comprising a fluidic seal assembly for a chromatography column. The present disclosure also relates to fluidic connections for a gas chromatography instrument.

BACKGROUND OF THE INVENTION

Gas chromatographs (GC) can analyze a gas, liquid, or solid sample by separating the constituents of the sample and producing a signal that indicates the quantity and type of analytes in the sample. A sample is injected into the inlet of the GC, either manually or using a sampling device. The sample, if not already in the gaseous state, is vaporized in the inlet and pushed onto the column by the pressurized carrier gas. Typical carrier gases used in gas chromatography include helium, hydrogen, nitrogen, and a mixture of argon and methane. Typical column flow rates vary from 0.5 ml/min to 20 ml/min, while pressures are typically in the range of vacuum to 150 psi. The column is heated by an oven or other heating device and contains a stationary phase that, along with the temperature of the column, separates the analytes of the sample. Temperatures for laboratory GC instruments generally range from −20 C to 450 C. The temperature of the column and other components of the GC can also be ramped. Ramp rates of the GC column are typically around 20 C/min, but sometimes go up to 60 C/min. After the separated analytes leave the column, they enter the detector, which produces a signal indicative of the amount and type of analyte in the sample. As heating technology advances, there is a desire to make laboratory GCs smaller and take up less bench space. Additionally, as pneumatic switching techniques, such as detector splitting, backflushing, heartcutting, etc. become more popular, there is a need to make many fluidic connections in a smaller space.

Gas chromatographs are available in various scales and configurations, including but not limited to laboratory GCs, mobile GCs, and micro GCs. Micro gas chromatographs are low-power, compact GC instruments that can be transported to a site to analyze a sample. A micro GC will typically contain one or more analysis channels which include an injector to transfer a volume of sample to the column, a column assembly comprising a column to separate analytes in the sample, a detector to produce a signal indicative of the amount of analyte from the column, and other components. They typically have one or more heaters to heat the column, injector, and/or other components. Temperatures for micro GC instruments are typically less than 180 C. A micro GC must have multiple fluid-tight connections between columns and other components of the instrument while remaining compact and transportable.

One of the traditional ways of making fluidic connections between tubes in GCs is a nut-ferrule connection. This type of connection uses a ferrule and nut to tightly hold tubes inside a fitting and create a fluid-tight seal between the tube, ferrule, and fitting. Fittings and ferrules have been utilized in this way to form fluid-tight fluidic connections between two tubes within a variety of flow components. Ferrules are often employed in applications entailing small-scale fluid flows, such as analytical instruments and microfluidic devices, and thus may be sized to join small-bore conduits such as capillary tubes or fluidic fittings. As one example, a ferrule may be utilized to join the end of a capillary-scale chromatographic column to a fitting that is part of or communicates with an analytical detector or the sample inlet of an analytical measurement device containing a detector such as, for example, a mass spectrometer. Ferrules are typically composed of a metal, graphite, or a composite such as graphite-polyimide. The capillary tubes used in the sample flow path of a GC and engaged by ferrules are often composed of fused silica with a polyimide coating; however, they could also be made of a metal, such as stainless steel. The tube inner diameters typically range from 0.05 mm to 0.55 mm. The body of a typical ferrule is axisymmetric and defines an internal bore through which the tube to be sealed is inserted. At least a portion of the ferrule, or "nose" portion, is often conical.

Nut-ferrule connections are widely used in gas chromatography instruments. However, using such connections in GC instruments has some disadvantages. One risk from use of a nut-ferrule connection is peak broadening or tailing due to dead volume (unswept or poorly swept volume such as cavities in the flow path) or excess volume between the tubes or within the fittings. Even a very small dead volume in a flow path can impact the GC chemical performance significantly, in particular in the micro GC which has a small thermal conductivity detector (TCD) cell volume. Additionally, micro GCs are small and compact and there is a desire to decrease the size of laboratory GCs, so it is not convenient or desirable for its user to do ferrule-nut connection or disconnection in a very limited space. This may lead to over tightening, which may cause column breakage or insufficient tightening, which may cause leakage due to poor sealing. It could also lead to incorrectly installing the column in the ferrule and fitting, resulting in excess dead volume in the flow path. The minimum spacing required between adjacent fittings is also dependent on being able to fit a wrench or wrenches (or other tightening features or tools) on the fitting to make these connections. This limits how small a GC can be, particularly in the case where there are many fittings in the instrument such as when multiple columns are installed. Additionally, the thermal mass of the connections can be significant, leading to cold spots in the flow path where sample can become trapped.

Another way of making connections between tubes in GCs is a glue-adaptor connection. This method is typically used in micro GCs where the maximum temperature is generally lower than in laboratory GCs. There is less peak broadening or tailing using the glue-adaptor connection than with a ferrule-nut connection. But the glue-adaptor connection also has disadvantages. After gluing a column, the detector and/or the injector are permanently attached to the column or at least require special tools to separate which may result in the damage of some components. This results in high cost of ownership for customers. Serviceability and supportability is also poor because it is difficult to separate the system components to isolate and locate the problem. Another disadvantage arises because the gluing process cannot be well controlled by a standard operating procedure and depends on an individual operator's skill. As a result, the manufacturability is poor, and the labor cost is high. Additionally, the glue will age under gas pressure and thermal cycling. Glue aging can result in increased dead volume or even leakage from the connection. Prior micro GC column assemblies have been difficult to replace in the field, typically requiring the entire module to be sent back to the factory and fixed or replaced completely.

SUMMARY OF THE INVENTION

As one aspect of the present invention, a fitting assembly is provided. The fitting assembly comprises one or more fluidic seal assemblies. Each fluidic seal assembly comprises a fitting comprising an inside fitting wall that defines a fitting bore; a ferrule comprising an inside ferrule wall that defines a ferrule bore, and the ferrule is disposed in the fitting bore; and a tube (such as a chromatography column) comprising first and second tube ends, and one of the tube ends is disposed in the ferrule bore. The ferrule is in compressive contact between the inside fitting wall and the tube so as to form seals between the ferrule and the tube and the ferrule and the fitting. The fitting assembly also comprises a holder defining one or more cavities (that is, the holder comprises one or more cavity walls that define cavities). Each of the cavity walls is configured to hold one of the fluidic seal assemblies. As a result, each of the fluidic seal assemblies is held in the holder. The present fitting assemblies provide easily installed fluidic connections with minimal dead volume in a flow path. The present fitting assemblies also allow a user to tighten ferrules in a controlled manner where there is room to use a tightening tool such as a wrench, as the minimum spacing between adjacent fittings is reduced.

As another aspect, a gas chromatography column assembly is provided. The GC column assembly comprises a GC column (such as an analytical column, a precolumn, a postcolumn, a guard column, or a reference column) having first and second column ends, and one or more fluidic seal assemblies. Each of the fluidic seal assemblies comprises a fitting, a ferrule and a column end. The fitting has an inside fitting wall that defines a fitting bore, and the ferrule is disposed in the fitting bore. The ferrule has an inside ferrule wall that defines a ferrule bore, and one of the column ends is disposed in the ferrule bore. The ferrule is in compressive contact between the inside fitting wall and the column so as to form a seal. The holder comprises a cavity wall defining a cavity, and the cavity wall is configured to hold one of the fluidic seal assemblies. As a result, each of the fluidic seal assemblies is held in the holder. In some embodiments, the GC column assembly comprises first and second fitting assemblies as described herein, wherein the first end of the GC column is the tube of a fluidic seal assembly of the first fitting assembly, and the second end of the GC column is the tube of a fluidic seal assembly of the second fitting assembly. In some embodiments, the GC column is a precolumn, and the column assembly further comprises an analytical column. In some embodiments, the GC column is a first column, and the column assembly further comprises a second column. In some embodiments, the GC column assembly also comprises a union that fluidically connects the second end of the precolumn and the first end of the analytical column, and a second end of the analytical column is disposed in a fluidic seal assembly of the second fitting assembly. In some embodiments, the GC column assembly further comprises a reference column having first and second ends. The first reference column end is disposed in a second fluidic seal assembly of the first fitting assembly. The second reference column end is disposed in a second fluidic seal assembly of the second fitting assembly.

As yet another aspect, a method for forming a fluidic seal between a GC column and a flow path of a GC is provided. The method comprises providing a gas chromatography (GC) column assembly as described herein and forming a direct or indirect fluidic connection between one of the column ends and (i) a flow path from an injector of the GC, or (ii) a flow path to a detector of the GC. In some embodiments, fluidic connections are formed between a first column end and a flow path from an injector, and/or between a second column end and a flow path to a detector. The first and second column ends can be ends of the same column or of different columns that are fluidically connected directly or indirectly via their other ends.

As another aspect of the present invention, novel fluidic connections for a GC column and other tubes are provided. The fluidic connections comprise a fitting assembly as described herein, and a mating flow path having an end fluidically connected to the tube end disposed in the fitting assembly. In some embodiments, the fluidic connection has little or no dead volume present between the fitting assembly and the mating flow path. In some embodiments, the fitting assembly has a protrusion, and the distance between a front face of the protrusion and a front face of the mating flow path is between 10% and 50%, alternatively between 20% and 50%, of the outer diameter of the protrusion.

In the foregoing aspects, a holder may define a plurality of cavities, and the fitting assembly comprises a plurality of fluidic seal assemblies held in the cavities. Each of the fittings of the fluidic seal assemblies may comprise first and second fitting ends and outside fitting wall between the first and second fitting ends, and the inside fitting wall is between the first and second ends. The fittings described above may further comprise a protrusion at the first fitting end, and an opening at the second end. The protrusion defines a protrusion flow path, and the protrusion is generally smaller (e.g., has a small diameter or other cross-sectional area) than the outside fitting wall, and the protrusion flow path is approximately the same in cross-sectional area as an inner diameter of the tube. The fitting assemblies described herein may also include a compliant seal material around the protrusion. A compliant seal material can facilitate formation of the fluidic seal between the two fittings.

These and other features and advantages of the present devices and methods will be apparent from the following detailed description, in conjunction with the appended claims.

Figure 1A:
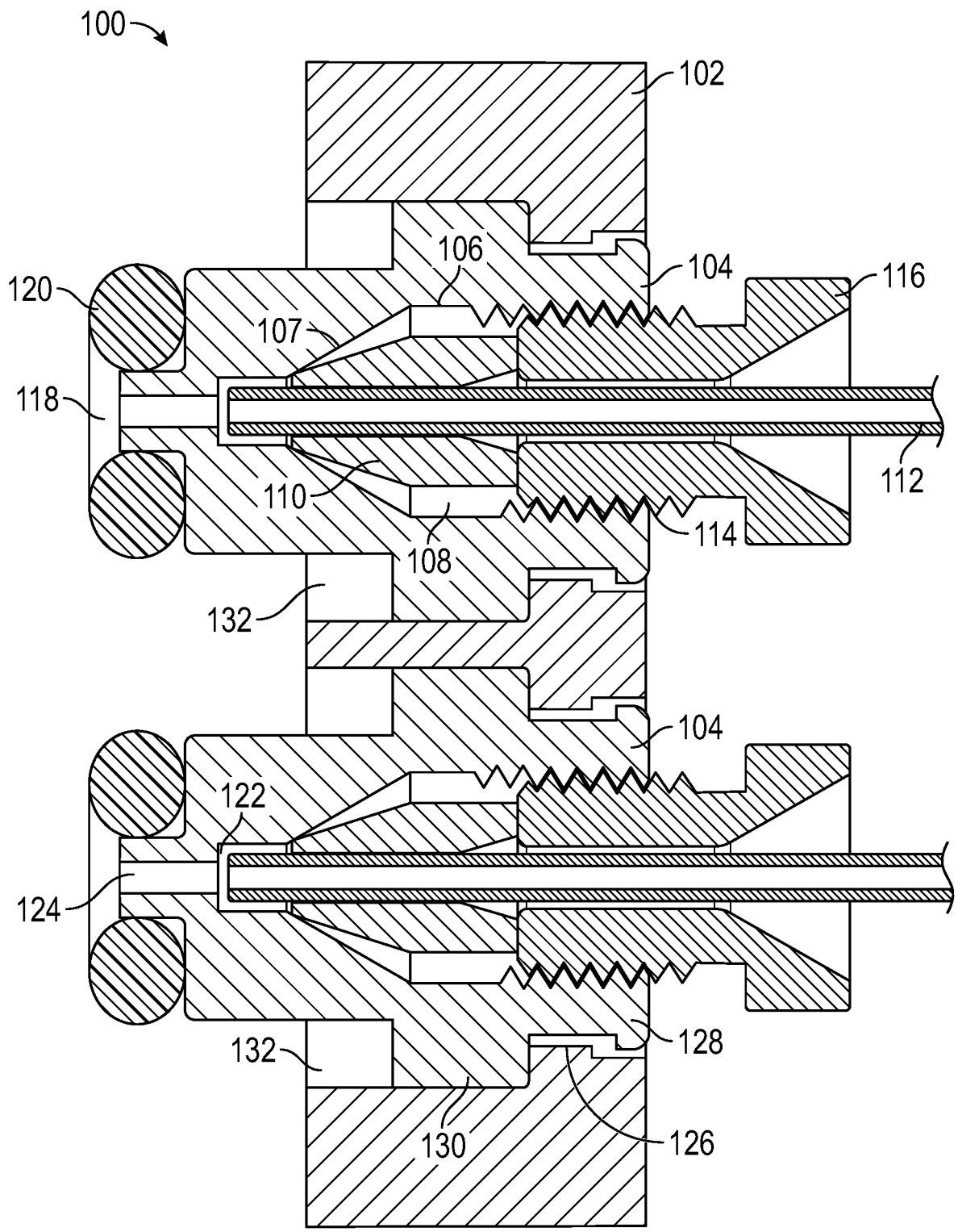
FIGS. 1A, 1B and 1C provide several views of an exemplary fitting assembly.

The present teachings are best understood from the following detailed description when read with the accompany-

DETAILED DESCRIPTION

It is to be understood that the terminology used herein is for purposes of describing particular embodiments only and is not intended to be limiting. The defined terms are in addition to the technical and scientific meanings of the defined terms as commonly understood and accepted in the technical field of the present teachings.

As used herein, the term "ferrule" generally encompasses any type of fluidic connector configured for forming a fluidic connection between a tube and a fluidic fitting with which the ferrule engages. A ferrule typically has a conical nose and forms a seal with the outer circumference of a tube and a conical surface of a fitting. The fluidic connection is typically fluid-tight within a specified range of intended operating pressures. In some applications, the ferrule and the tubes to which it may be connected have diameters on the millimeter- or micrometer-scale (e.g., capillary tubes, small-bore chromatographic columns, etc.), in which case the ferrule may be considered as being a microfluidic connector. In some small-scale examples, the ferrule may have a length ranging from 1 to 10 mm, a maximum outer diameter ranging from 1 to 10 mm, and a bore size (inside diameter) ranging from 0.1 to 5 mm. The ferrule may be configured to operate as a compression fitting. In some embodiments, the ferrule may be similar to that described in Norman et al. US Pat. App. Pub. 20160377203, or another available stainless steel or graphite-vespel ferrule. In some embodiments, a ferrule formed from stainless steel is preferred because it resists loosening as a result of thermal cycling. The ferrule may be coated in a conformal material such as gold or silver.

The term "fitting" generally encompasses any type of fluidic component configured for receiving a ferrule and forming a fluidic seal at an outer surface of the ferrule. Forming the fluidic seal establishes a fluid path between the inner bore of the ferrule (or a tube inserted in the ferrule) and the inner bore of the fitting.

The term "flow path" generally refers to any structure configured to provide for fluid flow. The flow path may be a tube or a channel formed in a substrate. A flow path may be formed by or comprise one or more tubes or channels in fluid communication. The geometry of a flow path may vary widely and includes circular, rectangular, square, D-shaped, trapezoidal or other polygonal cross-sections. A flow path may comprise varying geometries (e.g., rectangular at one section and trapezoidal at another section). In some embodiments, the cross-sectional area of a flow path used is substantially constant, e.g., in order to avoid or reduce dead volume or even extra swept volume.

The term "flow block" generally encompasses a structure that defines one or more flow paths, such as by a channel formed in a flow block or a tube supported within the flow block. In some embodiments, a flow block includes a manifold in communication with one or more flow block flow paths and/or one or more external flow paths. The term "connection block" generally refers to a structure configured to receive an end and/or flow path from one of the present fluidic seal assemblies and align it with another flow path, such as a mating fitting assembly. The connection block may provide support for the fitting assemblies and/or other components and may have features for affixing such components to the connection block. In some embodiments, the connection block has a first face configured to engage a fitting assembly, and a second face essentially parallel and opposite to the first face, wherein the second face is configured to engage one or more of a second fitting assembly, a flow block and/or an intermediate microfluidic device. For example, the connection block can be configured to engage a fitting assembly by having a plurality of holes that correspond with holes and/or fittings of the fitting assembly, such as two or more holes that corresponded in location and/or size with two or more fittings. The connection block may also provide features to mount the connection to or within an instrument.

The term "microfluidic device" refers to a flow block having features of micrometer and/or submicrometer dimensions. The features of the microfluidic devices may be adapted to a particular use. For example, microfluidic devices that are used in separation processes contain channels that can be from 1 µm to 200 µm in cross-sectional dimension, or from 10 µm to 75 µm in cross-sectional dimension, and ranging in length from 0.1 cm to 50 cm, or from 1 cm to 100 cm. A microfluidic device can be employed to perform one or more processes as a fluid passes through its channels, such as one or more chemical or physical processes on a sample or a component thereof. Such processes include, but are not limited to, removal of impurities, or injection of a specific amount of sample. In certain embodiments, microfluidic devices can be made by stacking and bonding layers. These layers can include features to form internal channels once layered and may be made with techniques such as chemical etching, laser cutting, or machining. Microfluidic devices can be made of multiple materials, such as but not limited to silicon, glass, metal, polyimide, or other types of plastics.

In the present disclosure, the terms "substantial" or "substantially" mean to within acceptable limits or degree to one having ordinary skill in the art. The terms "approximately" and "about" mean to within an acceptable limit or amount to one having ordinary skill in the art. The term "about" generally refers to plus or minus 15% of the indicated number. For example, "about 10" may indicate a range of 8.5 to 11.5. For example, "approximately the same" means that one of ordinary skill in the art considers the items being compared to be the same. When a ranges of values is set forth in the present disclosure, it should be understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described. All patents and publications referred to herein are expressly incorporated by reference.

As used in the specification and appended claims, the terms "a," "an," and "the" include both singular and plural referents, unless the context clearly dictates otherwise. Thus, for example, "a component" includes one component and plural components. The terms "first" and "second" fitting assemblies (or other "first" and "second" elements) are terms to distinguish different elements, not terms supplying a numerical limit, and a device having first and second element can also include a third, a fourth, a fifth, and so on, unless otherwise indicated.

In view of this disclosure it is noted that the methods can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

The present devices and methods improve the ease of installation and replacement of a GC column assembly by the end user by attaching a fitting assembly to the column ends in the factory. Pre-installing a fitting assembly onto a column assembly in the factory allows the end user to seal the column assembly to an injector or other components of an instrument more easily (in some embodiments, merely by tightening just one fastener) and seal the column assembly to the detector more easily (in some embodiments with just one fastener), making field replacement of the column assembly possible and simple. In some embodiments, the fitting assemblies are low-thermal mass which helps to avoid cold spots in the flow path and, therefore, thermal discrimination of analytes.

Fitting Assembly

A cross-section of an exemplary fitting assembly is shown in FIG. 1A. The fitting assembly 100 includes a holder 102 with one or more cavities 132 to hold fittings 104. The holder 102 can be any suitable material, such as metal or plastic, and may be selected depending on what temperatures are contemplated for fluid flowing through or surrounding the fittings. In some embodiments when the holder is subjected to temperatures less than 250 C, the holder is formed from a polymer such as polyether ether ketone (PEEK). In one embodiment, the holder can have any suitable dimensions, such as a length from 12 mm to 80 mm, alternatively from 24 to 40 mm, a width from about 4 mm to about 64 mm, alternatively from about 8 mm to about 32 mm, and a thickness from about 2 mm to about 32, alternatively from about 4 mm to about 16 mm. For example, in some embodiments, the holder has a length of about 32 mm, a width of about 16 mm, and a thickness of about 8 mm. The holder can have a desired number of cavities, for example 1, 2, 3, 4, 5, 6, 7, 8 or more cavities, for holding fluidic seal assemblies. In some embodiments, the holder has 4 or 5 cavities and holds 4 or 5 of the fluidic seal assemblies. The holder can have a cut-away portion to accommodate a permanent connection or other features of a connection block or other GC components.

The cavities in the holder and the outside wall of the fittings can be circular, rectangular, square or any desired shape in cross-section (although circular can be the easiest to fabricate if using conventional machining and requires less effort for alignment when inserting the fluidic seal assemblies in the cavities compared to other cross-sections). The cavities are defined by one or more cavity walls, and a column or other tube passes through the cavity. Cavity walls can be configured for interconnecting to the outside fitting walls, such as by having interlocking features or threads. Interlocking features include features that engage with each other by overlapping or cooperation of projections and recesses. The holder can be configured to securely hold a fitting in place, so that the fitting can only be removed by deliberate effort. Alternatively, the cavity walls of holder 102 do not have interlocking features, and the holder 102 is configured to hold fitting 104 in another way. For example, a fitting can sit on a front face of the holder and be held onto it and aligned with it by a holder component such as a secondary wireform or other simple clamp. In some embodiments, the cavity provides a path for the column or other tube to pass through while other features of the holder can orient and hold the fittings. Accordingly, the holder can be configured to hold the fittings and transfer the pressure from a clamping mechanism to the fittings to form a seal, and the fittings may or may not be inside the cavity.

Each fitting 104 comprises an inside fitting wall 106 surrounding a central axis and defining a fitting bore 108, such that a ferrule 110 can be disposed in the fitting bore 108. A fitting generally comprises first and second fitting ends with a fitting wall extending between the fitting ends. The fitting can have dimensions such as a diameter between 1 and 10 mm or alternatively between 2 to 4 mm, though the fitting can be scaled based on the capillary tubing's inner diameter, outer diameter, or other factors. The ferrule has a central axis and a ferrule bore, and column 112 or other tube extends through the ferrule bore of the ferrule 110. A sealing region of the ferrule is in compressive contact between the conical surface 107 of inside fitting wall 106 and the column 112. The fittings 104 are preferably metal, such as stainless steel, or another material with the hardness to support a seal without causing deformation to the fitting or galling of the threads. The fitting 104 may also have a threaded region 114 for engaging a threaded region of a nut 116. The fitting 104 may have a protrusion 118 on an end opposite its opening that receives the ferrule. At the end or front face of the protrusion, fluid exits the fitting 104 through outlet 124.

In some embodiments, the protrusion 118 is surrounded by a compliant seal material, such as a resilient, essentially fluid impermeable material in the form of an o-ring 120. The compliant seal material can be any shape suitable for the end of the fitting. For example, the compliant seal material may be a toroidal-shaped o-ring, a gasket with a rectangular cross-section, a metallic gasket, or another type of compliant material. In one embodiment, the compliant seal material can be a fluoroelastomer material. The protrusion 118 can align the compliant seal material 120, which will form a fluidic seal with an opposing fitting or other flow component mated with the fitting 104. The compliant seal material 120 makes a radial seal with protrusion 118 at the same time it makes an axial seal with fitting 104 and an opposing fitting. It is also contemplated that other seal orientations may be employed. The compliant seal material 120 can be various rubbers depending on the temperatures used and the carrier gas and analytes or solvents being injected, e.g. fluoropolymers, buna-n, EPDM or, in extreme cases, metallic with compliant over-plating. The compliant seal material may also be coated in a chemically inert coating if the material of the o-ring allows for it. This protrusion 118 can align the compliant seal material 120, help to hold the compliant seal material 120 on the fitting 104 during assembly, and keep most of the surface area of the compliant seal material 120 outside of the sample flow path, which reduces chemical interactions between the sample passing through the column 112 and the compliant seal material 120. The length of the protrusion 118 should be designed such that when fitting 104 is sealed to a mating fitting or other flow component, there is a sufficiently small gap between the end of the protrusion 118 and the surface of the mating fitting or other component to avoid dead volume in the flow path; however, the gap should be sufficient in size to allow agitation (or stirring) of the fluid as it travels through the gap. In some embodiments where the compliant seal material is in the form of an o-ring, the o-ring should compress by 15% to 25%, or by 20%, to create a fluid-tight seal. Alternatively, a flat or cylindrical gasket could be used as the compliant seal material instead of an o-ring, and the desired compression percentage may be different.

The column 112 can be a metal or fused silica capillary column. If fused silica, it may have a polyimide coating or other coating on the outside surface. In some embodiments, the column inner diameter is from 0.05 mm to 0.55 mm, while column outer diameters are generally from 0.25 mm to 0.8 mm.

The inside fitting wall 106 of the fitting has a conical surface 107 which is configured to form a seal with a ferrule 110. In contrast to a conventional nut-ferrule connection, the present fitting assembly avoids their disadvantages such as gas leakage and re-tightening by the end user. This is due in part to the fitting assembly being made in the factory and/or with a defined and repeatable process, and not by the end user, and it is not subject to variation and leaks due to end user ability. Suitable angles of the inside of the fitting and outside of the ferrule can be chosen, such as those disclosed in Norman et al. US Pat. App. Pub. 20160377203.

The ferrule 110 also forms a seal with the outside surface of the column 112. A ferrule generally comprises first and second ferrule ends, and the inside ferrule wall is between the first and second ends, and an outside ferrule wall is opposite the inside ferrule wall. The ferrule may be retained in the fitting bore by any suitable means such as, for example, a nut as described herein. Alternatively, the ferrule may be configured (i.e., sized and shaped) such that its rear section is press-fit against (i.e., makes an interference fit with) the inside fitting wall. Other means for retaining the ferrule may be employed, such as a press-fitted retainer, integrated catch features, etc.

A nut 116 or other fastener is inserted into the major opening of the fitting and adjusted to compress the ferrule 110 and form seals among the column 112, ferrule 110, and inside conical surface 107 of the fitting wall 106. The nut 116 can be tightened using a wrench. Alternatively, the ferrule 110 could be press-fit into the fitting, eliminating the need for the nut. For press-fitting, the outer diameter on the back end of the ferrule would be sized appropriately in relation to the inner diameter of the back of the fitting to facilitate a press-fit. In some embodiments, a nut or other fastener is preferred to avoid loosening of the ferrule during thermal cycling of the fitting assembly. The column-ferrule connection can be done in the factory to improve repeatability and avoid the end user having to precisely assemble small components. The column 112 generally protrudes beyond the ferrule 110 by a small distance. The inside of the fitting has a small recess 122 to accommodate this portion of the column 112. The inner diameter (or longest dimension of a non-circular shape) on the outlet 124 of the fitting through which the sample flows is similar to the inner diameter of the column 112 to avoid band broadening. The fitting may be deactivated to avoid interaction between the fitting and the analytes. The fitting is preferably metal or another hard material that avoids deformation of the fitting during sealing. The fitting is preferably a harder material than the ferrule or, if a conformal coating is present on the outside surface of the ferrule, the fitting is preferably a harder material than the conformal coating.

Figure 1B:
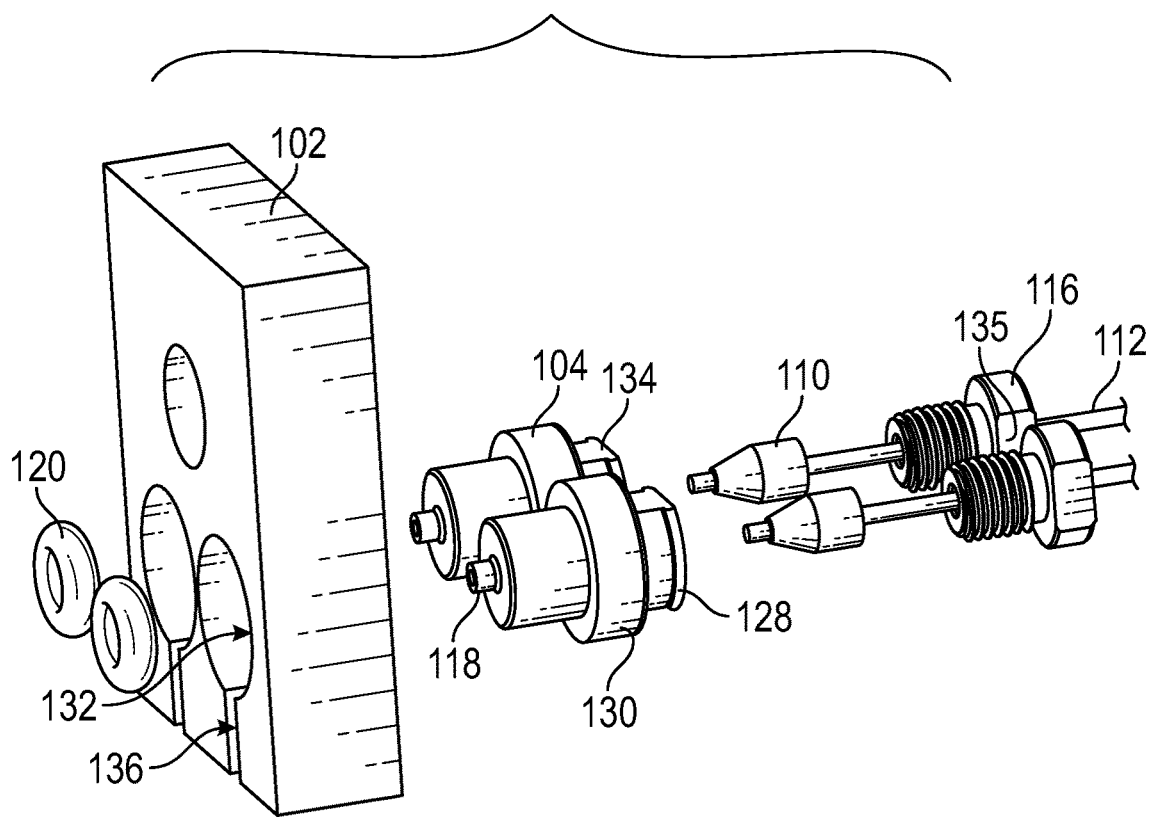

FIG. 1B shows an exploded view of an exemplary fitting assembly and also illustrates a method of manufacturing the fitting assembly. The nut 116 and ferrule 110 are slid onto the column 112. The nut is then threaded into the fitting 104. In some embodiments, the fitting 104 and the nut 116 both have wrench flats 134, 135 to facilitate turning the nut relative to the fitting. The fitting 104 is then slid or pressed into the holder 102. In some embodiments, the holder 102 and fittings 104 have one or more interconnecting features configured to hold the fittings in the holder. For instance, the holder may have a ledge 126 on the inner wall of the cavity 132 while the fitting may have a corresponding ridge 130 and a lip 128 on the outer fitting wall. In some embodiments, the distance between the lip 128 and the ridge 130 is greater than the height of the ledge 126, for instance, about 10% greater. This allows the fitting to be press fit into the holder and remain captive even if there are differences in thermal expansion between the fitting and the holder during heating of the column assembly. Additionally, the holder 102 can be configured to hold the fitting 104 such that the fitting is allowed to float within the holder and/or to constrain the ridge 130 of the fitting to be a slip fit with the cavity 132. Such configurations facilitate alignment of the ends of fittings and/or make mating fittings parallel in an embodiment where there are multiple fittings held in a holder. In some embodiments, the holder 102 may have a relief slot 136 extending into or through the cavity 132. This facilitates the column 112 to be attached to the fitting 104 prior to inserting the fitting 104 into the cavity 132 in the holder 102. Attaching the column 112 to the fitting 104 before pressing the fittings into the holder 102 allows the fittings to be closely spaced which reduces thermal mass of the fitting assemblies for fast heating and minimizing cold spots. If the columns 112 were attached after the fittings 104 were pressed into the holder 102, space for a wrench or other tool to tighten the nut compressing the ferrule would be necessary between each fitting, making the fitting assembly larger. This is a significant advantage of the present devices and methods. The relief slot 136 also allows the holder 102 to flex while the fitting 104 is being pressed into the holder. This reduces stress on the holder and the fitting during assembly. Once the fittings are placed or pressed into the holder, compliant seal material 120 is placed onto the ends of the fittings 104, preferably around protrusions 118. Alternatively, the compliant seal material 120 could be placed on the fittings immediately before being connected to a mating fitting assembly or placed into locations or recesses on a connection block 414 described below.

Figure 1C:
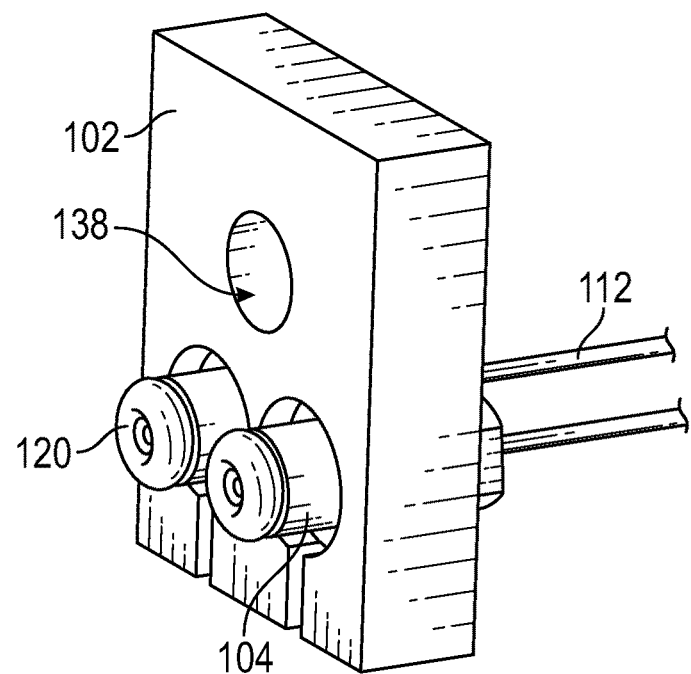

FIG. 1C shows a fitting assembly having two fittings 104 securely held by the holder 102. In some embodiments the holder also contains a clearance hole 138 or a threaded hole for a fastener to provide a force sufficient to the holder 102 to seal the fitting assembly to other components of the GC. In some embodiments, the fastener may be a captive fastener residing with the holder.

One of the advantages of the present fitting assembly is that it avoids a need for an end user to fasten multiple column ends to an instrument's flow components in separate steps. Because the fluidic seal assemblies are preassembled and minimal fasteners and/or clamping mechanisms are required by the customer to seal the fitting assembly in end use, the fittings can be spaced close together and not impact the installation of the column by the end user. This also reduces the thermal mass of the fitting assembly.

Column Assemblies Comprising One or More Fitting Assemblies

The present disclosure also provides novel column assemblies for use in GC instruments such as in a micro GC, laboratory GC, mobile GC or other GC. A column assembly comprises one or more chromatography columns along with supports and/or other structures to facilitate use of the column(s). For example, a column assembly can comprise a support ring on which one or more columns are wound. Some examples of columns are analytical columns which contain a stationary phase used to separate analytes in a sample, guard columns, which can protect the analytical column from contaminants by trapping them before they reach the analytical column, or columns that act as conduits between two points but could have an inert coating to reduce the interaction of analytes with the inner surface of the column. Additionally, a precolumn comes before another column in the flow path whereas a postcolumn comes after another column in the flow path. These may or may not have stationary phase coating. The column assembly may also hold a union where a plurality of columns meet. The union can be a simple union where two or more columns are fluidically joined or a purged union in which a plurality of columns meet, and a carrier gas is added to sample flow, such as to implement a type of pneumatic switching. Some examples of pneumatic switching include, but are not limited to, midcolumn backflushing, postcolumn backflushing, and precolumn backflushing. A column assembly can also have multiple analytical columns and the sample can be split between them if connected in parallel or pass through both of them if connected in series.

Additionally, a column assembly may also contain a reference column. The reference column is placed in parallel with the analytical column, and both have fluid-tight connections with other components. The reference column can facilitate distinguishing background signal factors from analyte signals.

Having a reference column and/or being able to implement backflushing, detector splitting, or any other type of pneumatic switching means that there can be a multiplicity of fluidic connections to be made when fluidically connecting the column assembly to the other components of the GC flow path. Given that multiplicity of connections, providing a column assembly having one or more of the present fitting assemblies at the ends of the columns results in a multiplicity of advantages and efficiencies over prior approaches.

Figure 2:
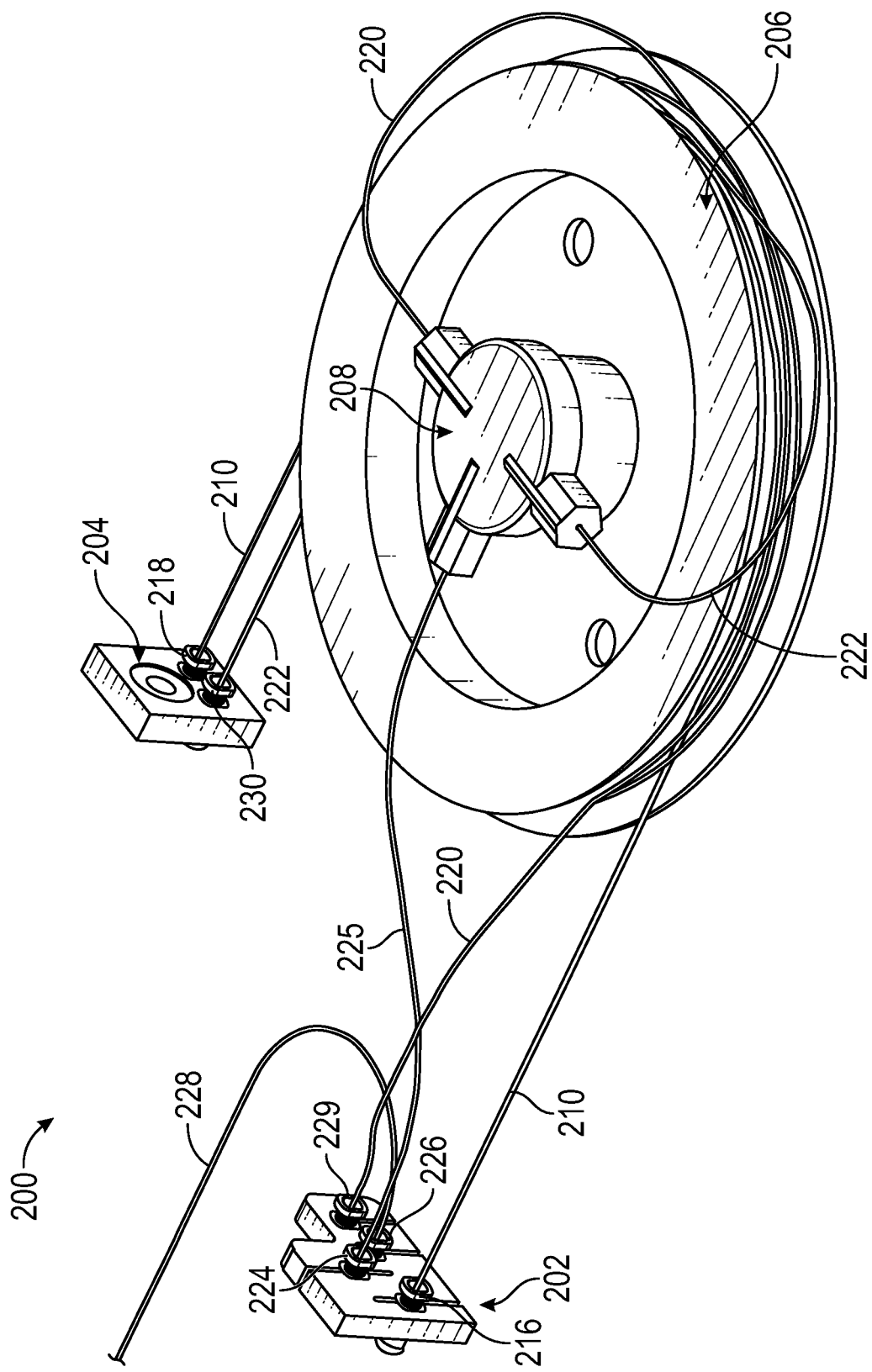
FIG. 2 illustrates an exemplary column assembly with first and second fitting assemblies attached to the inlet and outlet of a chromatography column.

FIG. 2 shows a column assembly 200 with first and second fitting assemblies 202, 204 attached to the inlet (injector side) of chromatography columns 210 and 220 and the outlet (detector side) of columns 210 and 222, respectively. The example column assembly 200 shown in FIG. 2 includes midcolumn backflushing capabilities, using a purged union 208 mounted in the middle of the support ring 206 (although this could also be mounted elsewhere). The column assembly 200 comprises a precolumn 220 into which the sample is initially injected. Analytes pass through the precolumn 220 to the analytical column 222, while later-eluting compounds remain in the precolumn 220. At a desired time, the backflush is instituted to reverse flow through the precolumn 220 and flush contaminants or analytes remaining in the precolumn back through the injector to waste. The inlet fitting assembly 202 on the injector side contains four fluidic seal assemblies, while the outlet fitting assembly 204 on the detector side contains two fluidic seal assemblies. The inlet end of the reference column 210 is the column of one of the fluidic seal assemblies 216 of the inlet fitting assembly 202, and the outlet end of the reference column 210 is one of the fluidic seal assemblies 218 of outlet fitting assembly 204. The inlet to the precolumn 220 is the column of fluidic seal assembly 229 of inlet fitting assembly 202, while the outlet to the precolumn 220 is attached to purged union 208. The inlet to the analytical column 222 is attached to purged union 208 while the outlet to the analytical column 222 is the column of fluidic seal assembly 230 of outlet fitting assembly 204. The inlet to carrier gas line 225 is the column of fluidic seal assembly 224 of inlet fitting assembly 202 while the outlet of the carrier gas line 225 is attached to purged union 208. The fitting assembly can include fluidic seal assemblies for other functions. The inlet fitting assembly 202 includes a fourth fluidic seal assembly 226 which the backflushed analytes can pass through. The arrangement shown in FIG. 2 is merely an example of the use of the disclosed fitting assemblies, as the devices and methods disclosed herein can be used with a wide variety of column assemblies. For example, they can be used with column assemblies having more or fewer columns, different types of columns, more or fewer purged unions, and/or other differences from the arrangement shown in FIG. 2. Additionally, the fitting assemblies described herein can be configured as inlet fitting assemblies, in which they comprise most or all column inlets, or as outlet fitting assemblies. Alternatively, the fitting assemblies can be configured for general use and do not have to be inlet or outlet specific. Inlet and outlet connections can be combined in one fitting assembly or split among multiple fitting assemblies, such as where some fitting assemblies have both injector-side and detector-side connections. The columns 210, 220, and 222 are shown wound onto a support ring 206, although other ways of supporting one or more columns are also contemplated. In addition to having multiple columns in one column assembly, a GC can also contain multiple column assemblies. While this may require more support rings and fitting assemblies, it would provide the benefit of being able to easily change individual columns in an instrument with a multi-column arrangement if one were to be more likely to get contaminated.

The present disclosure also provides a unique packaged column assembly which is more readily transported from manufacturer to end user. The packaged column assembly comprises a GC column assembly as described herein, and one or more fitting assembly supports removably attached to the column support, wherein the fitting assemblies are removably attached to fitting assembly supports. The packaged column assembly can also comprise packaging that surrounds and protects the column assembly, and/or instructions for installation of the column assembly in a GC. The support ring 206 may also have supports for the inlet and outlet fitting assemblies (not shown). These supports may be permanent or removable (for example, they may be used during shipping and/or handling of the column to avoid damage to the tails of the column). These supports may allow for some flexibility in position between the fitting assemblies to be able to align them independently of each other with mating GC components.

Fluidic Connection with Two Fitting Assemblies

Figure 3A:
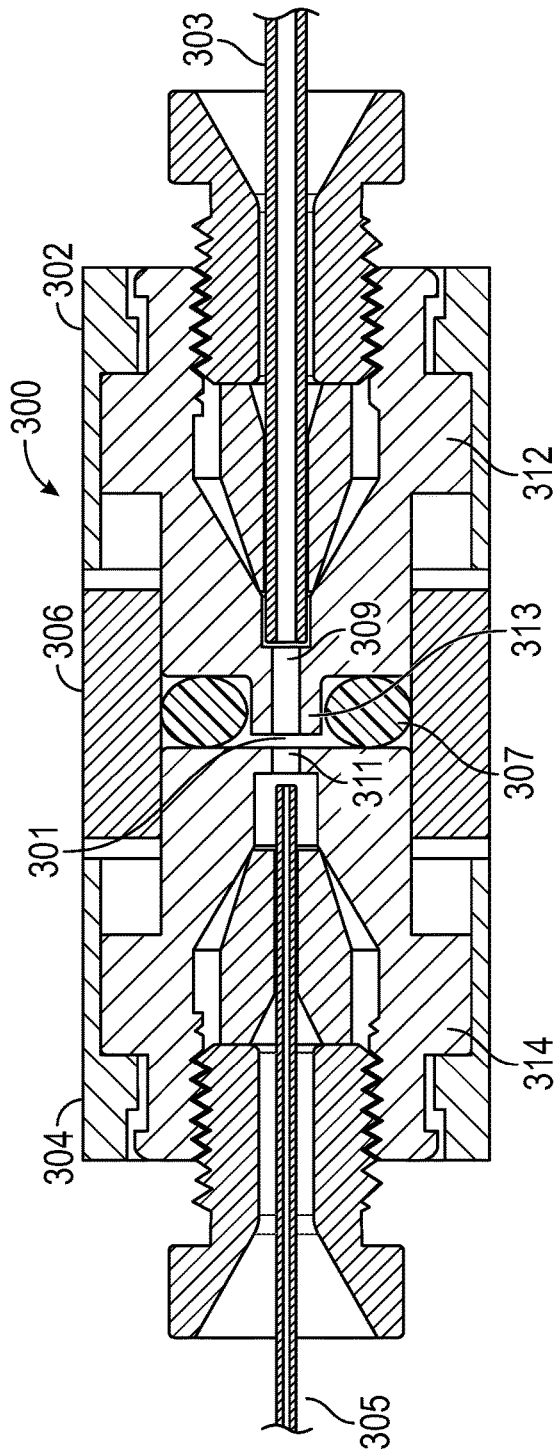
FIGS. 3A, 3B, 3C and 3D provide several views of an exemplary fitting-to-fitting fluidic connection where a fitting assembly connects to a mating fitting assembly of the same or similar type.
Figure 3B:
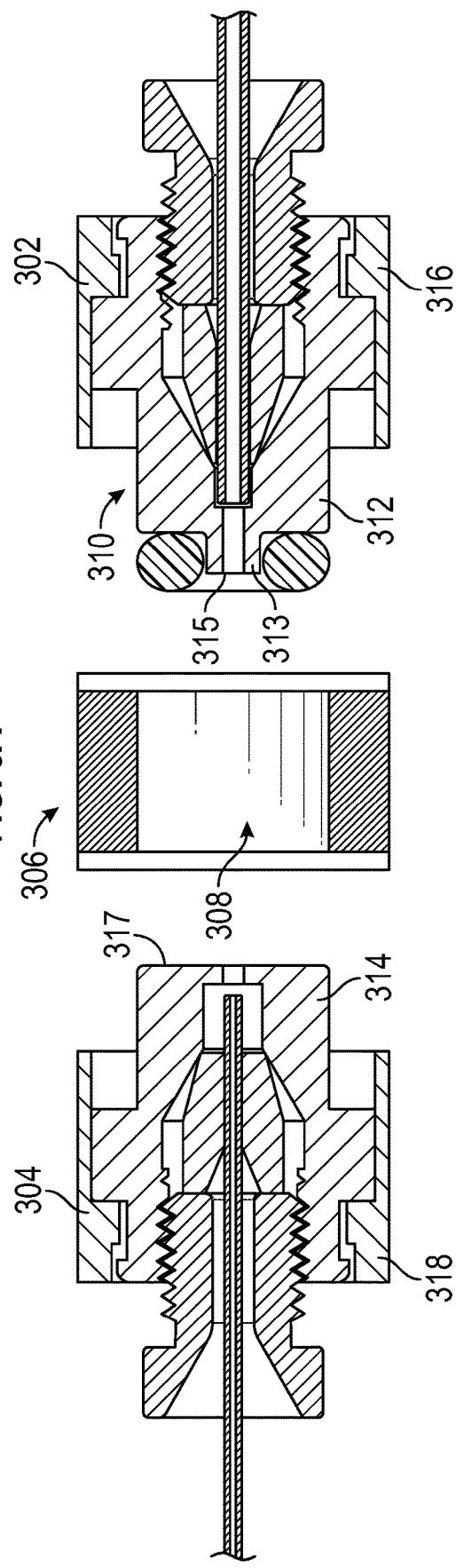
Figure 3C:
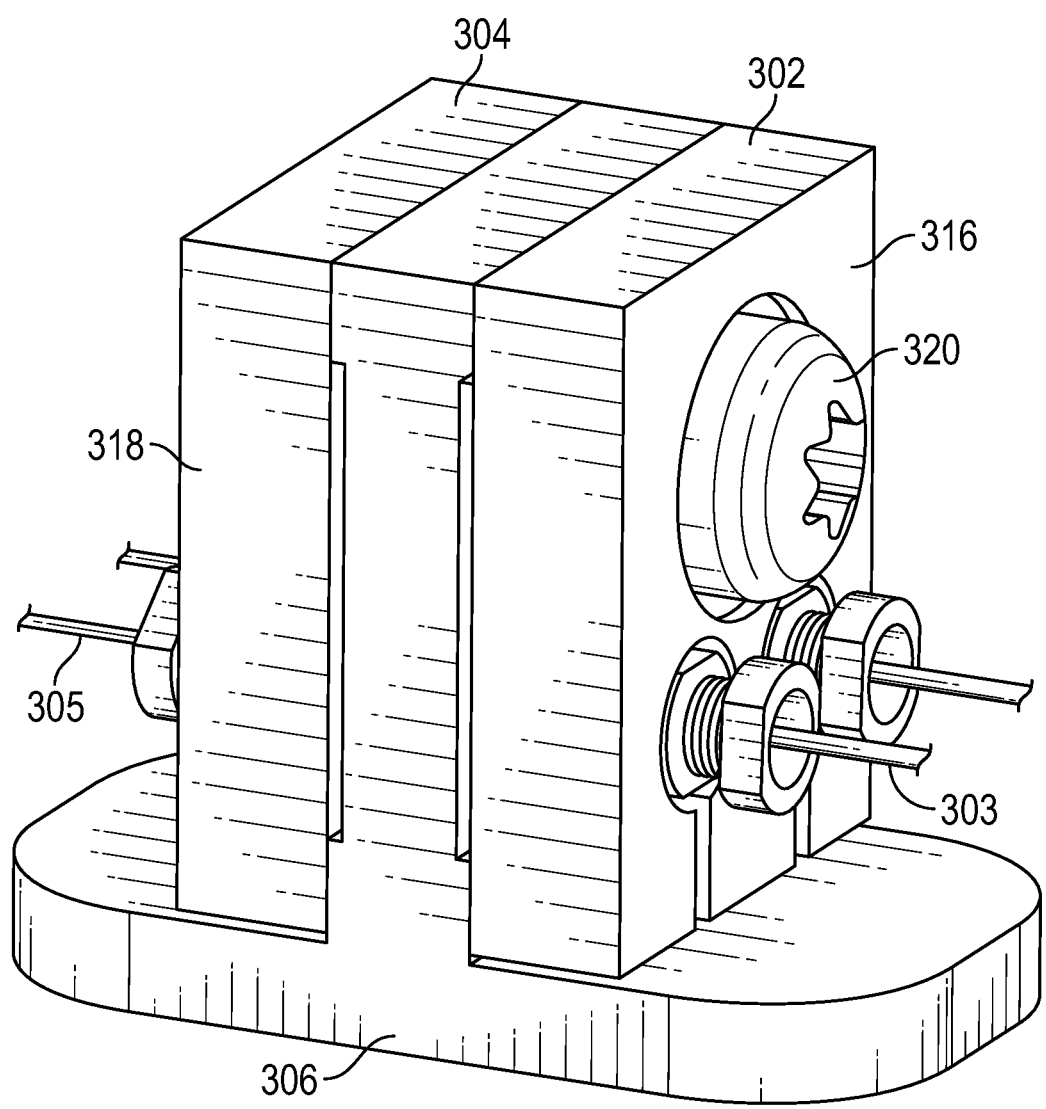

The present fitting assemblies can be used to create multiple types of direct or indirect fluidic connections between many types of columns, other tubes, microfluidic devices, and GC components such as inlets, injectors, and detectors. As a first example, a fitting-to-fitting fluidic connection is provided where a fitting assembly according to the present disclosure is arranged or held in a fluidic connection with a mating fitting of the same or similar type, or with a fitting of a different type. An exemplary fluidic connection 300 is shown in cross-section in FIG. 3A. The same device is shown prior to fluidically connecting the fittings in FIG. 3B, and is shown as an isometric view in FIG. 3C. In the embodiment shown here, a first fitting assembly 302 (for example, on the outlet of the column 303) mates and forms a fluidic connection with a second fitting assembly 304 (for example, on the inlet of a detector). For instance, the tube 305 on the mating detector fitting assembly 304 may be connected directly to a detector.

A connection block 306 is used to align the fittings from one fitting assembly 302 to the mating fittings from the other fitting assembly 304. The connection block should be made of a material capable of withstanding the temperature and force requirements for creating a seal, preferably metal or plastic. The connection block should have a CTE that is similar to that of the holder of the mating fitting assembly or assemblies to avoid differential thermal expansion between the two components during heating, which could compromise the seal. The connection block 306 can be affixed to a housing or surface of the GC instrument or to another surface. It can also be captive with the housing but allowed to float relative to the housing. The outer fitting wall 310 of the fitting is configured to provide a slip fit with the connection hole 308 in the connection block 306. This aligns the fitting 312, and, therefore, the fluidic seal assembly, from one fitting assembly 302 to a mating fitting 314 and fluidic seal assembly of the mating fitting assembly 304. Features other than the outer fitting wall 310 of the fittings could be used for alignment, for example features on the holders 316 and 318 of the fitting assembly could provide alignment between the fitting assemblies, though the slip fit alignment of the fittings provides good precision with minimal tolerance stack-up. Alternatively, the holder of one of the fitting assemblies could be thicker where the cavity in the holder of one fitting assembly extends past the end of the fitting to create an alignment hole for a mating fluidic seal assembly and eliminate the need for a separate connection block by integrating the features of the connection block into one of the holders.

The fittings, holder, compliant seal material, and connection block cooperate so that little or no dead volume is present between the flow path 309 of the protrusion 313 of the first fitting 312 and the flow path 311 of the second fitting 314. In the interstitial void 301 (See FIG. 3A) between the front face 315 (FIG. 3B) of protrusion 313 and the front face 317 (FIG. 3B) of second fitting 314, where the compliant seal material 307 resides, the void is sufficiently open such that there is stirring or agitation throughout the extent of the void. If this void is overly tight, stirring of fluid passing from flow path 309 to flow path 311 is prevented. This results in peak tailing and broadening in analysis of a sample that has passed through the void 301. If the void is too large, sample can accumulate in this volume. It is contemplated that the narrow crevices between the compliant seal material 307 and the fittings 312, 214 is diminishingly small and, while temperatures are kept above condensation point(s) of any analyte in sample passing through void 301, the present devices and methods have high chromatographic efficacy. In some embodiments, the distance between the front face 315 of the protrusion 313 and the front face 317 of the mating fitting 314 is between 10% and 50% of the outer diameter of the protrusion, alternatively between 20% and 50%.

The length of the protrusion, the thickness of the connection block, and the amount that the fittings extend past the faces of the holders are configured such that the compliant seal material sufficiently compresses (typically about 20% when an o-ring is employed) while leaving enough space for stirring of the fluid between the tip of the protrusion and the front face of the mating fitting. In some embodiments, the holder of each fitting assembly bottoms out on the connection block to limit the compression of the compliant seal material when making a leak-free seal. In other embodiments, other features of the fitting assembly could provide the compression limiter for the compliant seal material. Additionally, the present devices and methods can be configured so that a set force is used to seal the fitting assemblies to each other, thereby specifying the amount of compression of the compliant seal material. The compliant seal material is compressed along the axis of the fittings as well as radially toward the protrusion outer wall of the fitting. In some embodiments, the geometry of the protrusion is conical or an alternate shape which minimizes voids when the compliant seal material is compressed.

Figure 3D:
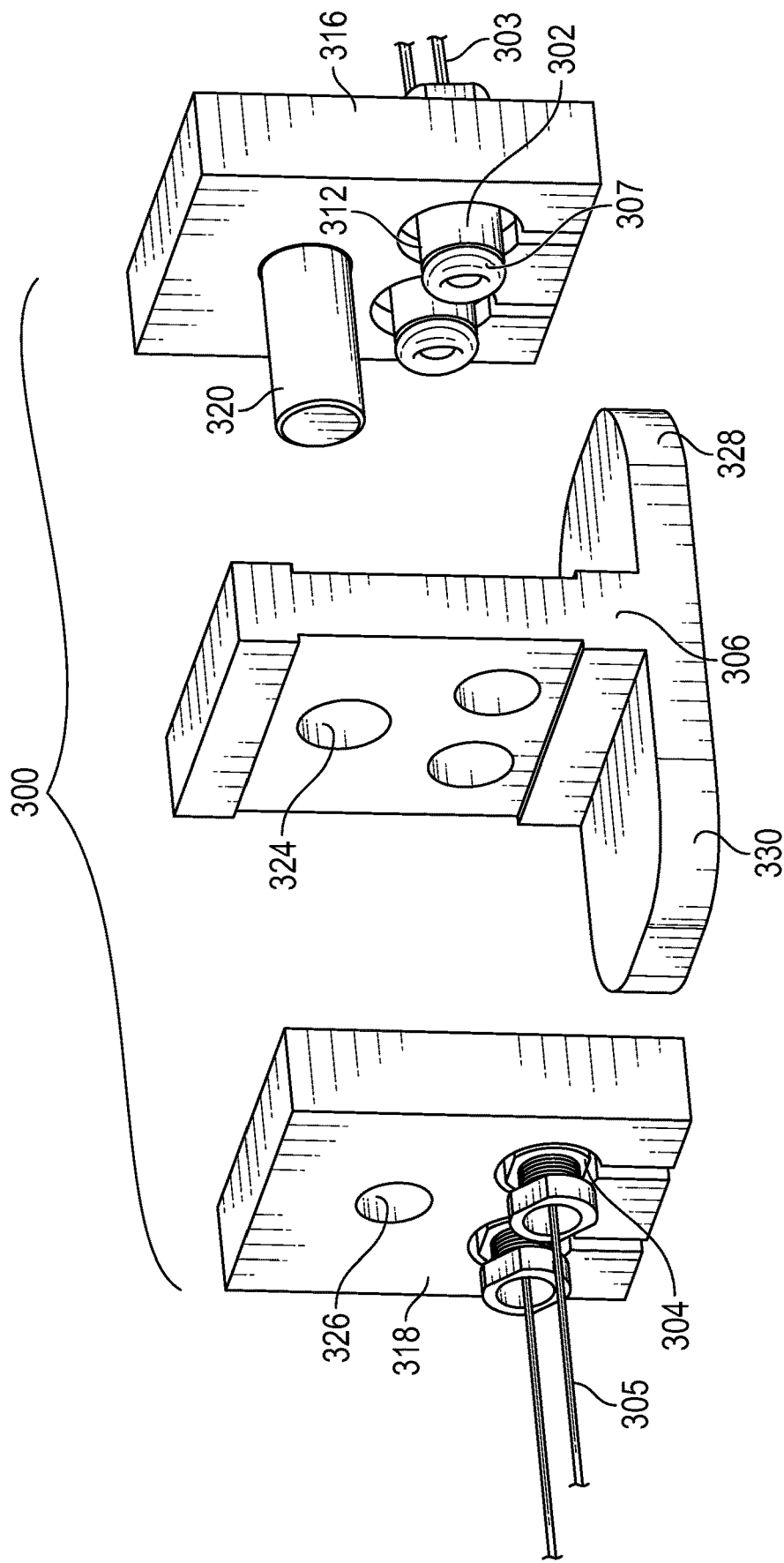

In some embodiments, the fitting assemblies 302, 304 and connection block 306 are secured by a single fastener, and the connection block and holders are configured to be secured by a single fastener. By way of example, the connection block can have a clearance hole, a threaded hole, and/or an alignment feature on its first and second faces (such as a recess or pins or indents). For instance, in FIGS. 3C and 3D, a fastener 320 slips through the clearance hole in one fitting assembly holder 316, through a clearance hole 324 in the connection block 306, and threads into a threaded hole 326 in the mating fitting assembly holder 318. Tightening this fastener allows the compliant seal material 307 from one fitting assembly 302 to press against the ends of the fittings from the mating fitting assembly 304, forming a gas tight seal. Alternatively, each fitting assembly could have its own fastener that threads into a connection block having threaded holes. Other mechanisms for securing the fitting assemblies and compressing the o-rings could be used such as clamps or bands. The chosen mechanism should be resistant to loosening during thermal cycling of the fitting assemblies and not add significant thermal mass to the assembly. The second fitting assembly may or may not contain a compliant seal material and may or may not have a protrusion on the end of the fitting. If a protrusion were present on the second fitting assembly 304 of this fluidic connection 300, it can be configured (such as by having a size or shape) to slip into the inside diameter of the compliant seal material 307 on the mating fitting 312 when the connection is formed between the two fitting assemblies. If it does have the protrusion, then the protrusion on the fitting that holds the compliant seal material would be shorter to accommodate this additional protrusion. Advantages to having the protrusion only on the fitting that holds the compliant seal material are that the protrusion can be longer and can better hold the compliant seal material (for example, an o-ring) in place, and that the compliant seal material will not be pinched between two protrusions during assembly. The connection block 306 can include one or more projections or features configured for securing the connection block to a GC instrument. For example, connection block 306 includes flanges 330, 328 which are configured for securing the connection block to the housing of an instrument (such as by a fastener) without interfering with the connection block's engagement of the fitting assemblies 302, 304. These should be designed to not significantly increase the thermal mass or thermal losses from the assembly.

Fluidic Connection with a Flow Block

Figure 4:
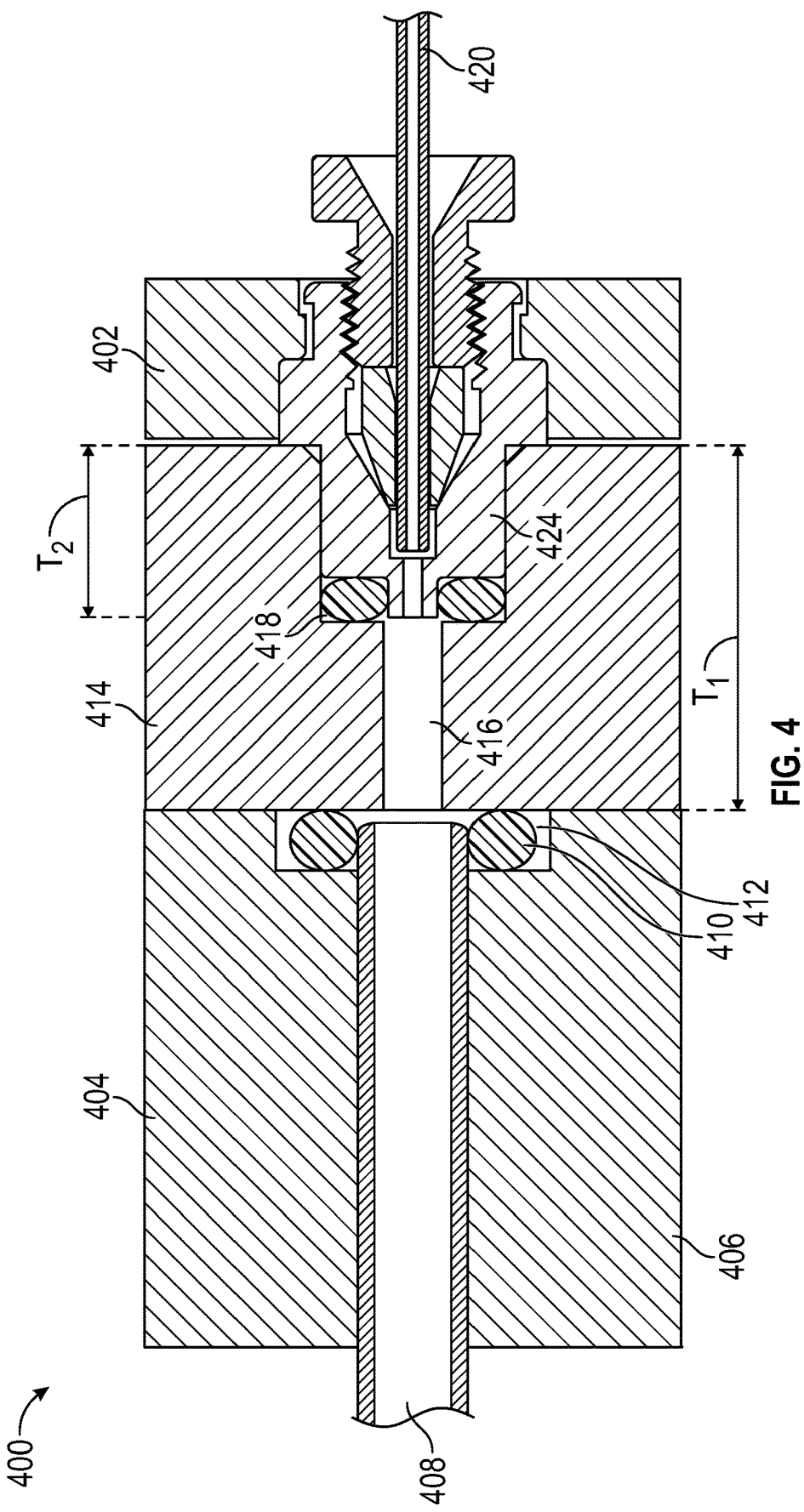
FIG. 4 illustrates an exemplary fluidic connection according to the present disclosure in which a fitting assembly mates with a flow block.

Another example of the advantageous use of the present fitting assembly is shown in the fluidic connection 400 shown in FIG. 4. A fitting assembly 402 mates with a flow block 404. In gas chromatography instrumentation, a flow block 404 is often used to connect carrier gases which push the sample through the column to a column assembly and/or injector, carrier gases for providing the backflushing pressure source to the column assembly, and/or gases for pneumatically controlled valves to the injector (described below as an intermediate microfluidic device). Additionally, the fitting-to-flow block connection could connect a sample inlet (where the user injects the sample into the GC) to a column via the injector (described below as an intermediate microfluidic device) or directly to the column. As mentioned previously, the fitting assembly 402 can have multiple fittings in it, while the flow block 404 can similarly have multiple flow paths.

In the embodiment shown in FIG. 4, the flow block 404 has a tube holder 406 with tubes 408 protruding from it. These tubes 408 can be affixed in any manner, such as glued, welded, brazed, etc., to the flow block 404. Metallic tubes (e.g. stainless steels) are commonly welded or brazed in cases where a fitting is not used. Non-metallic tubes, e.g. fused silica, PEEK, will have a polymeric outer surface and where fittings and ferrules are not holding them, often an adhesive, e.g. epoxies, or polyurethanes, acrylics, etc. is used—much depends on the temperature and chemical application space. A compliant seal material (for example, an o-ring) 410 is placed around the end of the tube 408, preferably in a recess 412 within the flow block 404. The connection block 414 serves to align the fitting assembly 402 using the outer fitting wall 424 of the fittings and a corresponding hole in the connection block 414, although other alignment techniques are contemplated. On the flow block side, pins or other alignment features located on the connection block and/or flow block align the flow block with the connection block. For example, the outside edges of the flow block could align in a recess with the connection block. A flow path 416 with minimal dead volume is provided in the connection block flow path 414 between the surface that mates with the flow block 404 and a recess into which the fitting 418 resides. In some embodiments, this is facilitated by flow path 416 having a diameter or other cross-section that closely matches that of the tube 408 in the flow block 404 or the column 420. Thickness $T_2$ is selected or determined, along with the length of mating features on the fitting, to result in the correct amount of compliant seal material compression to make a seal (again, typically about 20% when an o-ring is employed) before the flange of the fitting or holder bottoms out on the connection block.

In some embodiments, the connection block 414 has a thickness $T_1$ greater than the thickness of the recess $T_2$ configured for the fitting 418, so that the fitting does not extend all the way through the connection block 414 and mate directly to the flow block 404. This allows that in some fluidic connections, an intermediate microfluidic device can be included (as described in more detail below). This difference in $T_1$ and $T_2$ allows a single fitting assembly to engage in more than one type of connection and/or to mate with more than one other component. By way of example, the connection block can be configured to engage both a flow block and an intermediate microfluidic device, wherein the connection block has a recess for receiving the microfluidic device, and the recess is flanked at least in part by a surface for engaging a flow block. Alternatively, if additional space is not desired for an intermediate microfluidic device, the recess in the connection block into which the fittings on the fitting assembly are located could go entirely through the connection block, and the compliant seal material on the flow block and recess could be eliminated, as the compliant seal material on the fitting assembly could seal directly to the flow block. Alternatively, if an intermediate microfluidic device is desired between some components, a recess could instead be built into the flow block or the holder of the fitting assembly rather than the connection block.

Fluidic Connection with a Flow Block and an Intermediate Microfluidic Device

Figure 5:
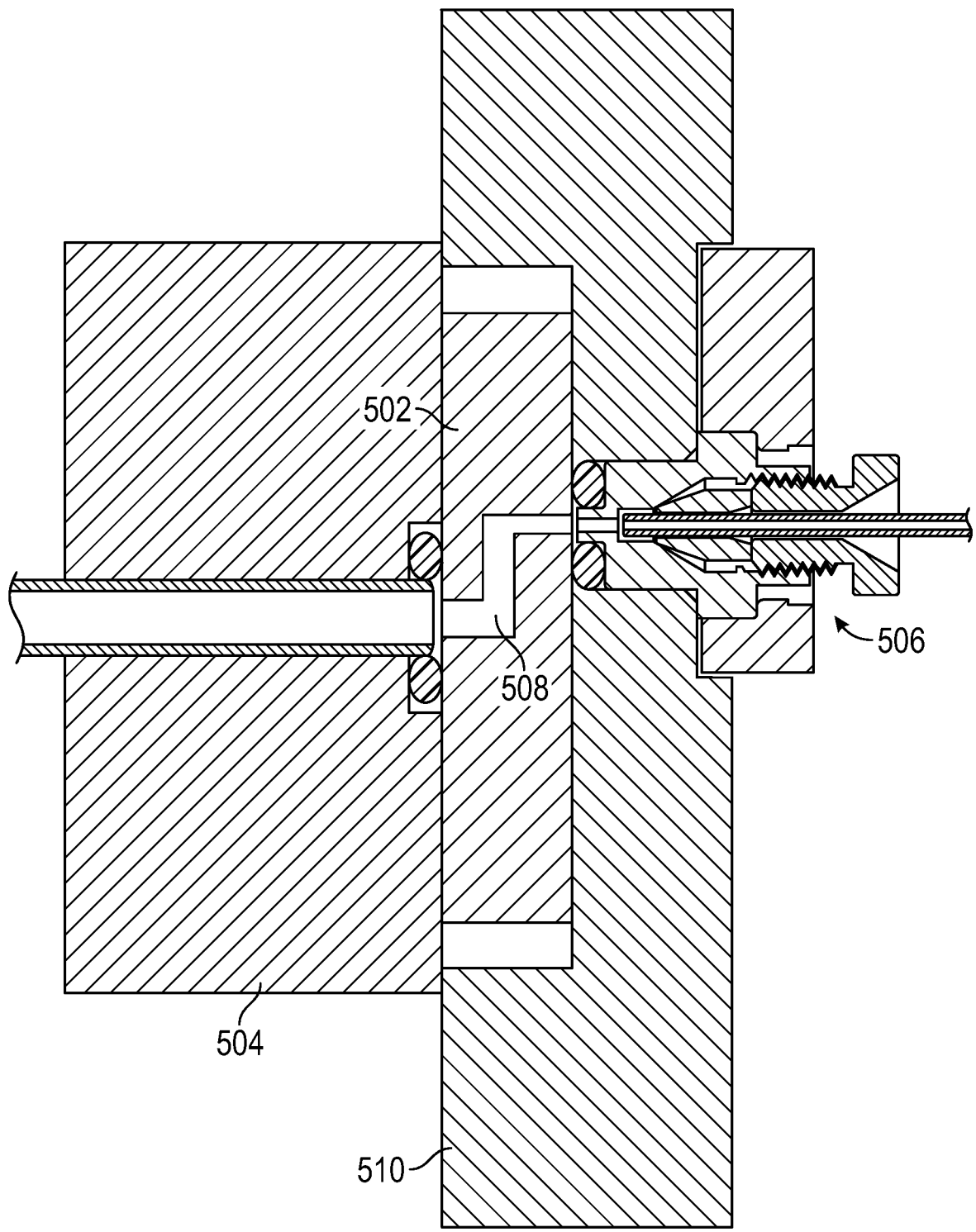
FIG. 5 illustrates another exemplary fluidic connection which comprises a fitting assembly, an intermediate microfluidic device, and a flow block.

Another example of the use of the present fitting assembly is shown in FIG. 5, where an intermediate microfluidic device 502 is located between the flow block 504 and the fitting assembly 506. The microfluidic device 502 could have flow channels 508 integrated into it to incorporate restrictions, sample loops, or other elements, and the flow paths in the flow block 504 and fitting assembly 506 could be offset from each other (axes not directly aligned as shown here). In some embodiments, the microfluidic device 502 has a non-linear flow path having first and second ends, wherein the first end is aligned with the fitting flow path, and the second end is aligned with a flow path of the flow block. The microfluidic device 502 could also have pneumatic valves integrated into it, and some of the connections from either the flow block 504 or the fitting assembly 506 could be used to provide pressurized gasses to actuate those valves. The microfluidic device 502 could be a layered, bonded device made out of metal, glass, plastic, or other material. An example that could use an intermediate microfluidic device is the injector that mates to the fitting assembly on the inlet of the column. The injector of a micro GC is typically a microfluidic device that contains valves and a sample loop and restrictions to distribute the appropriate volume of flow from the sample inlet to the inlet of the analytical column or the pre-column.

As an alternative, the fitting assembly 506 could mate to the microfluidic device 502 or other flow block 504 without an intervening connection block 510. A clamp and compression limiter as well as alignment features could be included to create the fluidic seal and suitable positioning between the fittings and the openings of the microfluidic channels.

Fitting Assembly with Multiple Fluidic Connections

Figure 6A:
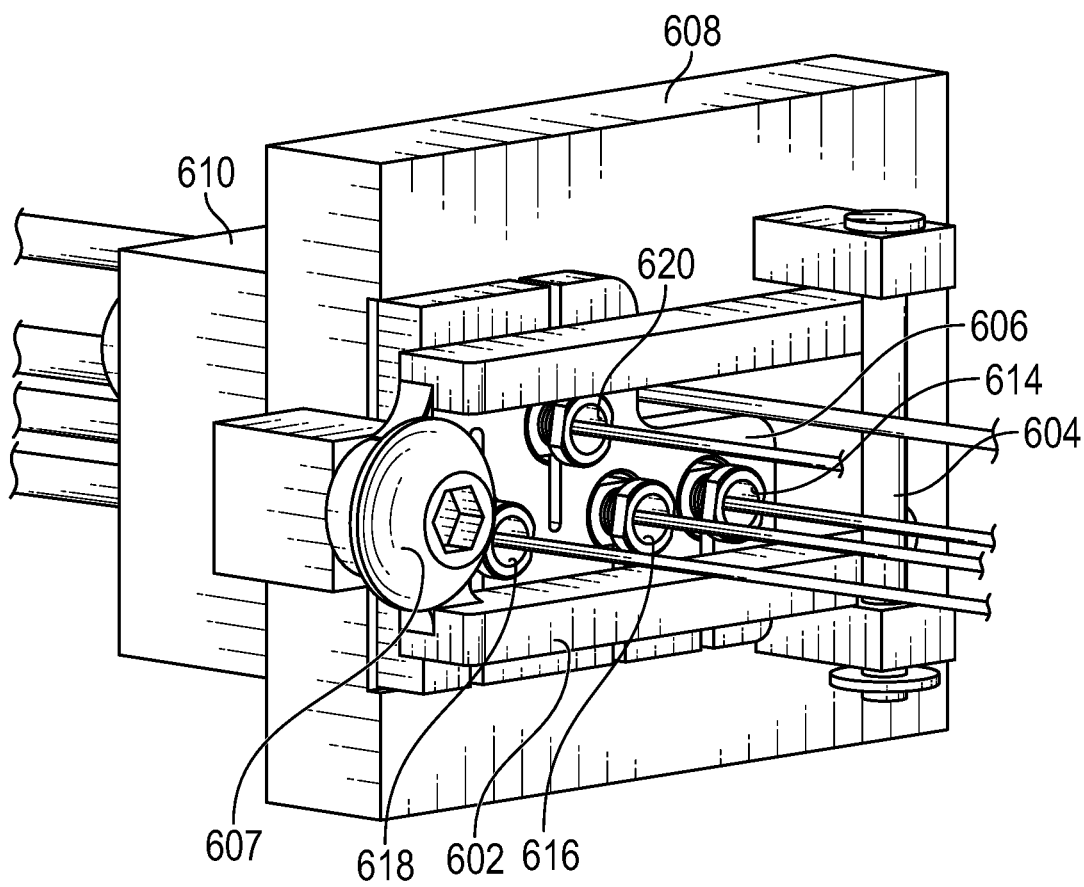
FIGS. 6A, 6B and 6C provide several views of an exemplary fluidic connection in which an alternative manner of securing a fitting assembly to a connection block is demonstrated.

As discussed above, an advantage of some embodiments is that a single fitting assembly can mate with multiple types of flow components with different types of connections. FIG. 6A illustrates an alternative manner of securing a fitting assembly 606 to a connection block 608. The connection block 608 comprises an external clamp, that is, a clamp external to the fitting assembly 606 which does not pass through the holder of the fitting assembly. An external clamp is an exemplary way of providing a clamping force, and others are described below and/or may be selected in light of the present disclosure. The external clamp shown in FIG. 6A includes a clamp arm 602, a fixed support rod 604, and a fastener 607. The clamp arm 602 can be integral with the fixed support rod 604, or it may be a separate piece that is placed under the support rod 604 on one side. The fastener 607 secures the clamp arm 602 to the opposite side. Having a clamp arm that is open on one side (shown in detail in the exploded view in FIG. 6B) can allow some permanent fittings and tubes to be integrated into the connection block and while preserving the ability to remove the clamp arm. A permanent connection may be desired for a location where the sample enters from the GC inlet (e.g., where the user injects the sample into the flow path of the GC). This permanent connection could alternatively be integrated in the mating flow block 610 shown here. Advantages of this embodiment include a more even distribution of force over the entire fitting assembly; compression the compliant seal material by an appropriate and essentially equal amount; and ensuring parallelism between the mating fittings. Multiple fasteners spread across the fitting assembly could also apply substantially uniform compression to the compliant seal material; however, this would require a user to tighten multiple fasteners when making a connection and could possibly increase the thermal mass of the fitting assembly and connection block.

Figure 6B:
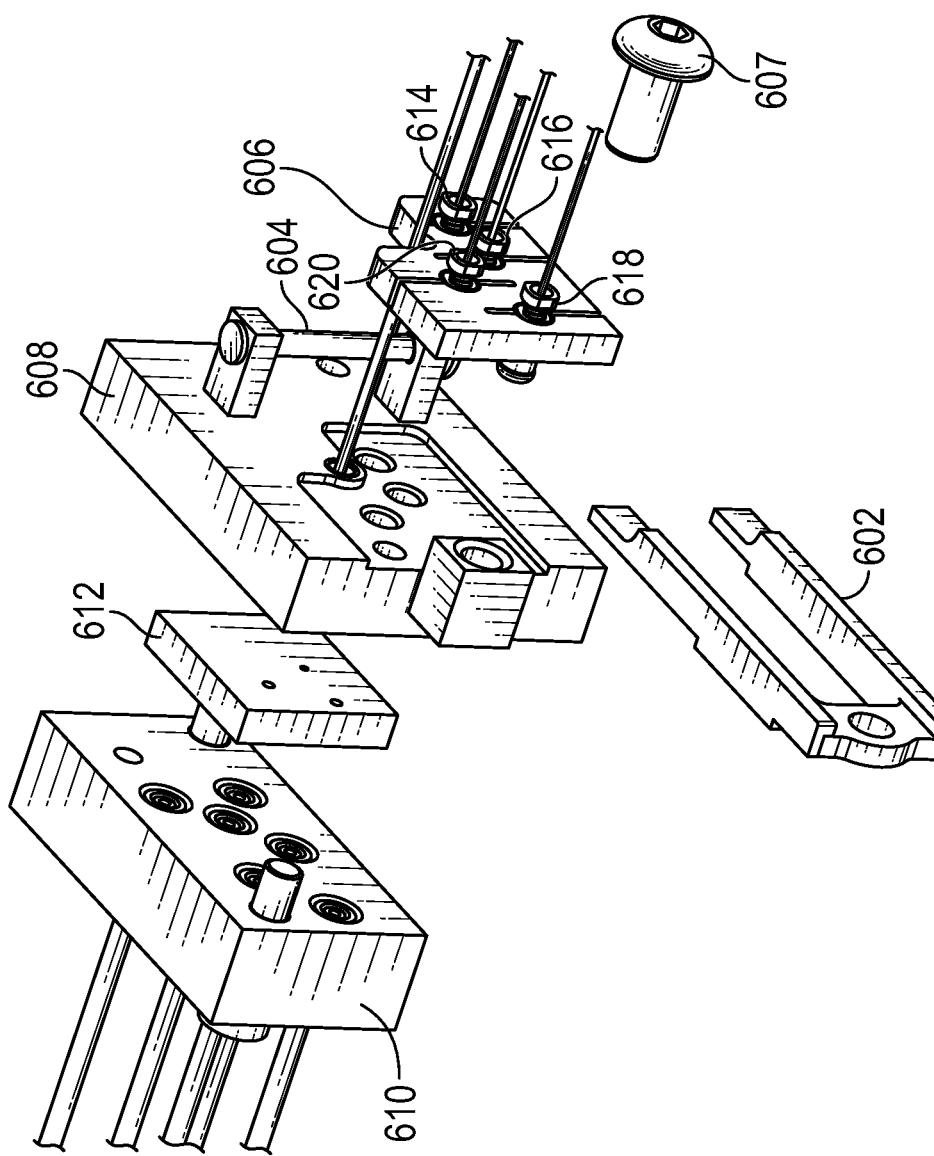
Figure 6C:
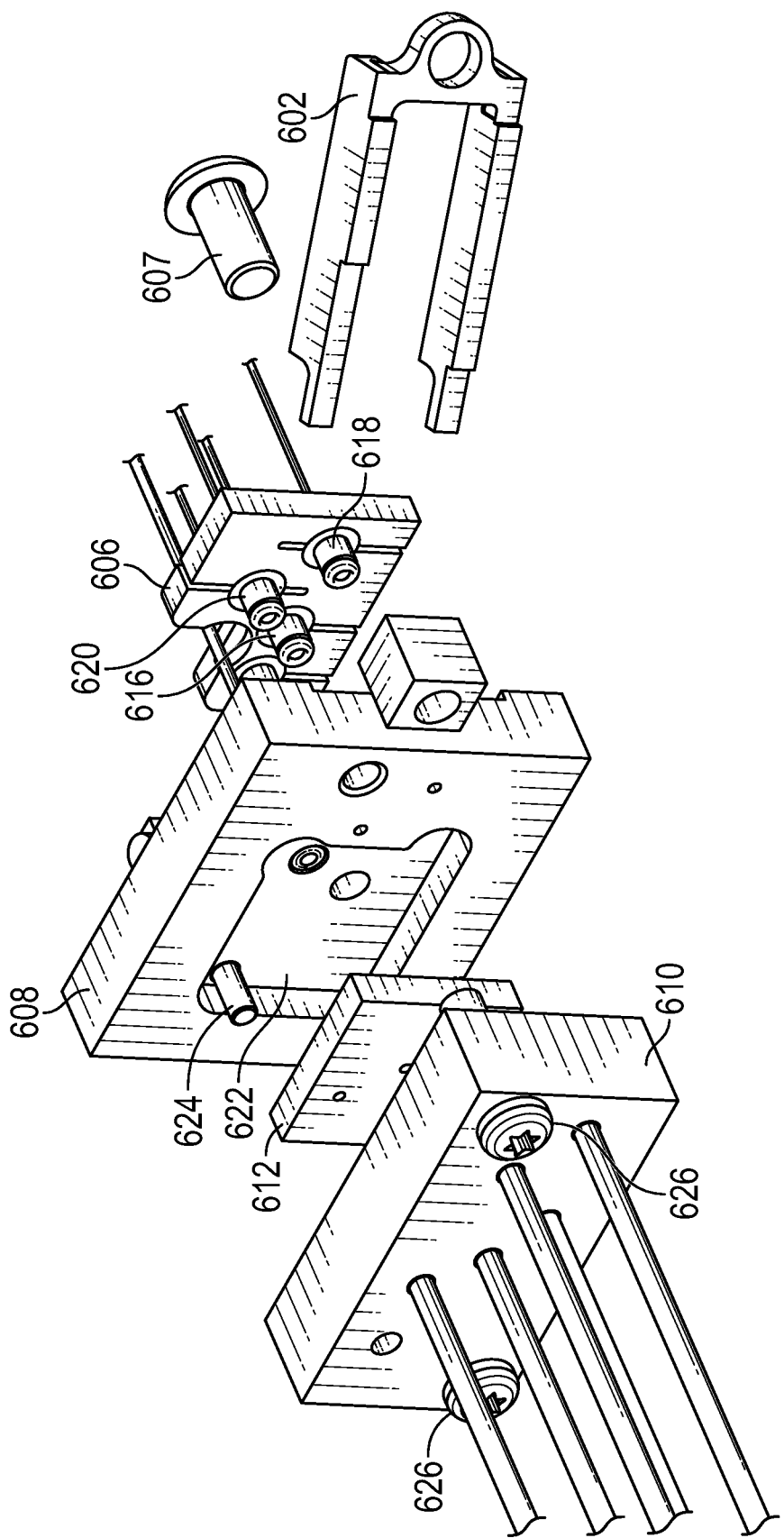

An exploded view of a connection block having a permanent connection is shown in FIGS. 6B and 6C. An intermediate microfluidic device 612 is included between the two fittings 614, 616 on the right side of the fitting assembly 606, while no microfluidic device is inserted between the fittings 618, 620 on the left side of the fitting assembly 606 (as viewed from the fitting assembly side). The fittings 618, 620 on the left side of the fitting assembly mate directly with the flow block 610. The recess 622 that aligns the intermediate microfluidic device 612 to the connection block 608 can be seen in FIG. 6C. Also shown is a pin 624 that positions the flow block 610 and the connection block, while the fasteners 626 shown on the flow block 610 prevent rotation between the two components. Alternatively, other positioning or alignment techniques could be used.

The external clamp and the fastener inserted through the holder are examples of ways to provide a clamping force to the fluidic connections described herein. Like the fastener, the external clamp can provide clamping force to the holder and then to the fittings indirectly to form a seal. It is contemplated that alternative ways can be included to provide this clamping force, such as by adding a motor, a pneumatic device, or other system to the present devices.

The connection block, tubes, fittings, and any other component which contacts the sample can be coated or treated (e.g., deactivated) to reduce interaction of analytes in the sample with the surfaces of the components. For example, surfaces which contact the sample can be subjected to Ultimetal™ or Ultra Inert™ chemical deactivation.

EXEMPLARY EMBODIMENTS

Exemplary embodiments provided in accordance with the presently disclosed subject matter include, but are not limited to, the following:

Embodiment 1. A fitting assembly comprising: one or more fluidic seal assemblies, wherein each fluidic seal assembly comprises: a fitting comprising an inside fitting wall that defines a fitting bore, a ferrule comprising an inside ferrule wall that defines a ferrule bore, and the ferrule is disposed in the fitting bore; a tube comprising first and second tube ends, and one of the tube ends is disposed in the ferrule bore; wherein the ferrule is in compressive contact between the inside fitting wall and the tube so as to form a seal; a holder comprising a cavity wall defining a cavity, and each of the cavity walls is configured to hold one of the fluidic seal assemblies; wherein each of the fluidic seal assemblies is held by the holder.

Embodiment 2. The fitting assembly of embodiment 1, wherein the holder defines a plurality of cavities, and the fitting assembly comprises a plurality of fluidic seal assemblies held in the cavities.

Embodiment 3. The fitting assembly of embodiment 1 or 2, wherein each of the fittings comprises first and second fitting ends and outside fitting wall between the first and second fitting ends; and the fitting further comprises a protrusion at the first fitting end, and the protrusion defines a protrusion flow path, and the protrusion flow path is approximately the same in cross-sectional area as the tube.

Embodiment 4. The fitting assembly of claim 3, wherein each of the fluidic seal assemblies further comprises a compliant seal material around the protrusion.

Embodiment 5. The fitting assembly of any of embodiments 1 to 4, wherein the fitting comprises an outside fitting wall, and the outside fitting wall and the cavity wall have interlocking features configured to hold the fitting in the holder.

Embodiment 6. The fitting assembly of any of embodiments 1 to 5, wherein the holder is formed from polyether ether ketone (PEEK).

Embodiment 7. A chromatography column assembly comprising: a chromatography column having first and second column ends; and one or more fluidic seal assemblies. Each of the fluidic seal assemblies comprises: a fitting comprising an inside fitting wall that defines a fitting bore, a ferrule comprising an inside ferrule wall that defines a ferrule bore, and the ferrule is disposed in the fitting bore; wherein one of the column ends is disposed in the ferrule bore, and the ferrule is in compressive contact between the inside fitting wall and the column so as to form a seal. The chromatography column assembly also comprises a holder comprising a cavity wall defining a cavity, and where the tube passes through the cavity. Each of the fluidic seal assemblies is held in the holder.

Embodiment 8. The column assembly of embodiment 7, wherein the column is a first column, and the column assembly further comprises a second column.

Embodiment 9. The column assembly of any of embodiments 7 to 8, further comprising a second fitting assembly.

Embodiment 10. The column assembly of any of embodiments 7 to 9, wherein the column comprises fused silica.

Embodiment 11. The column assembly of any of embodiments 7 to 10, further comprising a column support such as a support ring.

Embodiment 12. A method for forming a fluidic seal between a column and a flow path of a GC, the method comprising: providing a column assembly according as described herein, such as the column assembly of any of embodiments 7 to 11; forming a fluidic connection between one of the column ends and (i) a flow path from an injector of the GC, or (ii) a flow path to a detector of the GC.

Embodiment 13. A fluidic connection comprising a first fitting assembly according to embodiments 1 to 6 or described elsewhere in the present disclosure; and a mating flow path having an end fluidically connected to the tube end disposed in the fitting assembly.

Embodiment 14. The fluidic connection of embodiment 13, wherein the mating flow path comprises a second fitting assembly, and the second fitting assembly makes a fluidic seal with the first fitting assembly.

Embodiment 15. The fluidic connection of embodiment 13 or 14, further comprising a compliant seal material located between the first fitting assembly and the mating flow path.

Embodiment 16. The fluidic connection of embodiment 15, wherein the first fitting assembly has a protrusion, and the compliant seal material is configured to fit around the protrusion.

Embodiment 17. The fluidic connection of embodiment 16, wherein the protrusion has a diameter and a front face, and the mating flow path has a front face, wherein a void is defined by the protrusion front face, the compliant seal material, and the mating path front face, and the void has a size that allows stirring of a fluid that is passing from the protrusion to the mating flow path, without allowing the fluid to to accumulate in the void.

Embodiment 18. The fluidic connection of embodiment 16, wherein the protrusion has an outer diameter and a front face, and the mating flow path has a front face, and the protrusion front face and the mating path front face are separated by a distance between 10% and 50%, alternatively between 20% and 50%, of the outer diameter of the protrusion.

Embodiment 19. The fluidic connection of any of embodiments 13 to 18, further comprising a connection block having a first face configured to engage the fitting assembly, and a second face configured to engage one or more of a flow block, a second fitting assembly, and an intermediate microfluidic device.

Embodiment 20. The fluidic connection of any of embodiments 13 to 19, further comprising an external clamp configured to provide a clamping force to form a seal between the first fitting assembly and the end of the mating flow path.

The foregoing description of exemplary or preferred embodiments should be taken as illustrating, rather than as limiting the present invention as defined by the embodiments. As will be readily appreciated, numerous variations and combinations of the features set forth above can be utilized without departing from the present invention as set forth in the embodiments. Such variations are not regarded as a departure from the scope of the invention, and all such variations are intended to be included within the scope of the following embodiments. All references cited herein are incorporated by reference in their entireties.

We claim:

1. A fitting assembly comprising:
    one or more fluidic seal assemblies, wherein each fluidic seal assembly comprises:
        a fitting comprising an inside fitting wall that defines a fitting bore,
        a ferrule comprising an inside ferrule wall that defines a ferrule bore, and the ferrule is disposed in the fitting bore;
        a tube comprising first and second tube ends, and one of the tube ends is disposed in the ferrule bore;
        wherein the ferrule is in compressive contact between the inside fitting wall and the tube so as to form a seal;
        a holder comprising a cavity wall defining a cavity where the tube passes through the cavity;
        wherein each of the fluidic seal assemblies is held by the holder, and
        the fitting comprises first and second fitting ends and an outside fitting wall between the first and second fitting ends;
        the fitting further comprises a protrusion at the first fitting end, and the protrusion defines a protrusion flow path, and each of the fluidic seal assemblies further comprises a compliant seal material around the protrusion.

2. The fitting assembly of claim 1, wherein the holder defines a plurality of cavities, and the fitting assembly comprises a plurality of fluidic seal assemblies comprising tubes passing through the cavities.

3. The fitting assembly of claim 1, wherein
    the protrusion flow path is approximately the same in cross-sectional area as the tube.

4. The fitting assembly of claim 1, wherein the outside fitting wall and the cavity wall have interlocking features configured to hold the fitting in the holder.

5. The fitting assembly of claim 1, wherein the holder is formed from polyether ether ketone (PEEK).

6. A fluidic connection comprising:
    a first fitting assembly according to claim 1; and
    a mating flow path having an end fluidically connected to the tube end disposed in the fitting assembly.

7. The fluidic connection of claim 6, wherein the mating flow path comprises a second fitting assembly, and the second fitting assembly makes a fluidic seal with the first fitting assembly.

8. The fluidic connection of claim 6, wherein the compliant seal material is located between the first fitting assembly and the mating flow path.

9. The fluidic connection of claim 6, wherein the protrusion has an outer diameter and a front face, and the mating flow path has a front face, wherein a void is defined by the protrusion front face, the compliant seal material, and the mating flow path front face, and
    the void has a size that allows stirring of a fluid that is passing from the protrusion to the mating flow path, without allowing fluid to accumulate in the void.

10. The fluidic connection of claim 6, wherein the protrusion has an outer diameter and a front face, and the mating flow path has a front face, and the protrusion front face and the mating flow path front face are separated by a distance between 10% and 50% of the outer diameter of the protrusion.

11. The fluidic connection of claim 6, further comprising a connection block comprising a first face configured to engage the fitting assembly and a second face configured to engage one or more of a flow block, a second fitting assembly, and an intermediate microfluidic device.

12. The fluidic connection of claim 6, further comprising an external clamp configured to provide a clamping force to form a seal between the first fitting assembly and the end of the mating flow path.

13. A chromatography column assembly comprising:
    a chromatography column having first and second column ends; and
    one or more fluidic seal assemblies, wherein each comprises:
        a fitting comprising an inside fitting wall that defines a fitting bore,
        a ferrule comprising an inside ferrule wall that defines a ferrule bore, and
        the ferrule is disposed in the fitting bore;
        wherein one of the column ends is disposed in the ferrule bore, and the ferrule is in compressive contact between the inside fitting wall and the column so as to form a seal;
        a holder comprising a cavity wall defining a cavity where the chromatography column passes through the cavity;
        wherein each of the fluidic seal assemblies is held by the holder, and
        the fitting comprises first and second fitting ends and an outside fitting wall between the first and second fitting ends;
        the fitting further comprises a protrusion at the first fitting end, and the protrusion defines a protrusion flow path, and each of the fluidic seal assemblies further comprises a compliant seal material around the protrusion.

14. The column assembly of claim 13, wherein the column is a first column, and the column assembly further comprises a second column.

15. The column assembly of claim 13, further comprising a second fitting assembly.

16. The column assembly of claim 13, wherein the column comprises fused silica.

17. The column assembly of claim 13, further comprising a column support.

18. A method for forming a fluidic seal between a column and a flow path of a GC, the method comprising:
   providing a column assembly according to claim 13;
   forming a fluidic connection between one of the column ends and (i) a flow path from an injector of the GC, or (ii) a flow path to a detector of the GC.

* * * * *